US010742652B2

United States Patent
Ezell et al.

(10) Patent No.: US 10,742,652 B2
(45) Date of Patent: Aug. 11, 2020

(54) MOBILE CALLER AUTHENTICATION FOR CONTACT CENTERS

(71) Applicant: Avaya Inc., Santa Clara, CA (US)

(72) Inventors: Joel Ezell, Broomfield, CO (US); David Chavez, Broomfield, CO (US); Michael Krack, Los Altos, CA (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/149,293

(22) Filed: Oct. 2, 2018

(65) Prior Publication Data

US 2019/0036922 A1    Jan. 31, 2019

Related U.S. Application Data

(62) Division of application No. 15/354,816, filed on Nov. 17, 2016, now Pat. No. 10,164,977.

(51) Int. Cl.
*H04L 29/06* (2006.01)

(52) U.S. Cl.
CPC ........ *H04L 63/0876* (2013.01); *H04L 63/083* (2013.01); *H04L 63/0861* (2013.01);
(Continued)

(58) Field of Classification Search
CPC .............. H04L 63/0876; H04L 63/083; H04L 63/0861; H04L 2463/082;
(Continued)

(56) References Cited

U.S. PATENT DOCUMENTS 9,301,140 B1    3/2016 Costigan et al.
9,344,892 B1 *  5/2016 Rodrigues ............. H04M 15/56
(Continued)

FOREIGN PATENT DOCUMENTS

| CN | 101605305 | 12/2009 |
|---|---|---|
| JP | 2011-198170 | 10/2011 |
| WO | WO 2016/048482 | 3/2016 |

OTHER PUBLICATIONS

"Block chain (database)," Wikipedia, Mar. 31, 2016, retrieved from https://web.archive.org/web/20160330201409/https://en.wikipedia.org/wiki/Block_chain_(database), 5 pages.
(Continued)

*Primary Examiner* — Meng Li
(74) *Attorney, Agent, or Firm* — Sheridan Ross P.C.

(57) ABSTRACT

A call request is received, from a mobile device, to establish a communication with a contact center. For example, the call request may be to establish a voice call with the contact center. In response to the call request, the mobile device sends authentication factors to a cloud authentication service that the user/mobile device has previously registered with. For example, the authentication factors may include usage factors of the mobile device, such as a call history of the user on the mobile device. If the authentication factors are validated, a token is generated. The token is sent to the contact center along with the call request. The token is validated at the contact center. At this point, the contact center knows that the user/mobile device are authentic. A call is then established between the user and the contact center.

20 Claims, 8 Drawing Sheets

(52) U.S. Cl.
CPC ... *H04L 2463/082* (2013.01); *H04M 2203/40* (2013.01); *H04M 2203/6045* (2013.01); *H04M 2203/6054* (2013.01); *H04M 2203/6072* (2013.01)

(58) Field of Classification Search
CPC . H04M 2203/6072; H04M 2203/6054; H04M 2203/40; H04M 2203/6045
See application file for complete search history.

(56) References Cited

U.S. PATENT DOCUMENTS

| | | | |
|---|---|---|---|
| 9,762,581 B1* | 9/2017 | Wang | H04L 63/10 |
| 1,016,497 A1 | 12/2018 | Ezell et al. | |
| 2006/0046689 A1 | 3/2006 | Kim | |
| 2006/0276171 A1* | 12/2006 | Pousti | G06Q 20/02 455/405 |
| 2007/0028298 A1 | 2/2007 | Snyder et al. | |
| 2010/0041424 A1 | 2/2010 | Osborn | |
| 2010/0330961 A1* | 12/2010 | Rogel | G06F 21/31 455/411 |
| 2012/0077462 A1 | 3/2012 | Rozensztejn et al. | |
| 2012/0167162 A1 | 6/2012 | Raleigh et al. | |
| 2012/0198539 A1* | 8/2012 | Liu | H04W 12/06 726/9 |
| 2013/0110728 A1* | 5/2013 | Kobres | G06Q 30/06 705/75 |
| 2013/0263233 A1 | 10/2013 | Dinha | |
| 2014/0286484 A1 | 9/2014 | Ehrlich et al. | |
| 2014/0379340 A1 | 12/2014 | Timem et al. | |
| 2015/0128240 A1 | 5/2015 | Richards et al. | |
| 2015/0143494 A1 | 5/2015 | Lee et al. | |
| 2015/0271206 A1* | 9/2015 | Schultz | G06F 21/6236 726/3 |
| 2015/0280929 A1 | 10/2015 | Balay et al. | |
| 2015/0324789 A1 | 11/2015 | Dvorak et al. | |
| 2015/0332283 A1 | 11/2015 | Witchey | |
| 2016/0065588 A1 | 3/2016 | Wheeler | |
| 2016/0294783 A1 | 10/2016 | Piqueras et al. | |
| 2017/0046792 A1 | 2/2017 | Haldenby et al. | |
| 2017/0048707 A1* | 2/2017 | Ortiz | H04W 12/06 |
| 2017/0295157 A1 | 10/2017 | Chavez et al. | |

OTHER PUBLICATIONS

Official Action for U.S. Appl. No. 15/284,103, dated Mar. 9, 2017 17 pages.
Official Action for U.S. Appl. No. 15/284,103, dated Jun. 30, 2017 23 pages.
Official Action for U.S. Appl. No. 15/284,103, dated Nov. 30, 2017 24 pages.
Notice of Allowance for U.S. Appl. No. 15/284,103, dated Mar. 14, 2018 9 pages.
Official Action for U.S. Appl. No. 15/354,816, dated Mar. 14, 2017 6 pages, Restriction Requirement.
Official Action for U.S. Appl. No. 15/354,816, dated Jul. 12, 2017 13 pages.
Official Action for U.S. Appl. No. 15/354,816, dated Dec. 11, 2017 16 pages.
Official Action for U.S. Appl. No. 15/354,816, dated Apr. 24, 2018 14 pages.
Notice of Allowance for U.S. Appl. No. 15/354,816, dated Aug. 10, 2018 9 pages.
Fromknecht et al. "A Decentralized Public Key Infrastructure with Identity Retention," Cryptology ePrint Archive: Report 2014/803, Nov. 2014, 16 pages [retrieved online from: eprint.iacr.org/2014/803.pdf].
Official Action for Japan Patent Application No. 2017-076017, dated Nov. 16, 2018 10 pages.
Official Action for United Kingdom Patent Application No. GB1705579.9, dated Sep. 29, 2017 8 pages.
Official Action with English Translation for China Patent Application No. 201710226887.X, dated Oct. 16, 2019 10 pages.
Official Action with English Translation for Japan Patent Application No. 2017-076017, dated Sep. 10, 2019 4 pages.

* cited by examiner

MOBILE CALLER AUTHENTICATION FOR CONTACT CENTERS

CROSS-REFERENCE RELATED TO APPLICATIONS

The present application is a divisional application of U.S. patent application Ser. No. 15/354,816, filed Nov. 17, 2016, entitled "MOBILE CALLER AUTHENTICATION FOR CONTACT CENTERS", which is incorporated herein by this reference in its entirety.

FIELD

The disclosure relates generally to contact centers and particularly to secure access for mobile users in a contact center.

BACKGROUND

Authenticating callers in a contact center has historically been an imprecise, onerous process. With the advent of mobile communication devices, this process has become even more difficult to verify if the calling party is actually who they say they are.

To deal with these problems, security questions are a commonly used mechanism to authenticate callers. If the security information becomes compromised, then another party may be able to pose as the user.

Solutions that use Automatic Number Identification (ANI) for the caller's identity tie the ANI to a particular location (land-line) or physical device (mobile device). However, using the ANI does not necessarily identify the correct user because the ANI may be spoofed. Moreover, the ANI does not ensure that the correct individual is using the phone.

Active/passive voice biometrics provide a high level of certainty that the correct party is speaking to an agent. However, this technology is very resource intensive if employed for each call to the contact center.

SUMMARY

These and other needs are addressed by the various embodiments and configurations of the present disclosure. A call request is received, from a mobile device, to establish a communication with a contact center. For example, the call request may be to establish a voice call with the contact center. In response to the call request, the mobile device sends authentication factors to a cloud authentication service that the user/mobile device has previously registered with. For example, the authentication factors may include usage factors of the mobile device, such as a call history of the user on the mobile device. If the authentication factors are validated, a token is generated. The token is sent to the contact center along with the call request. The token is validated at the contact center. At this point, the contact center knows that the user/mobile device are authentic. A call is then established between the user and the contact center.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6.

Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
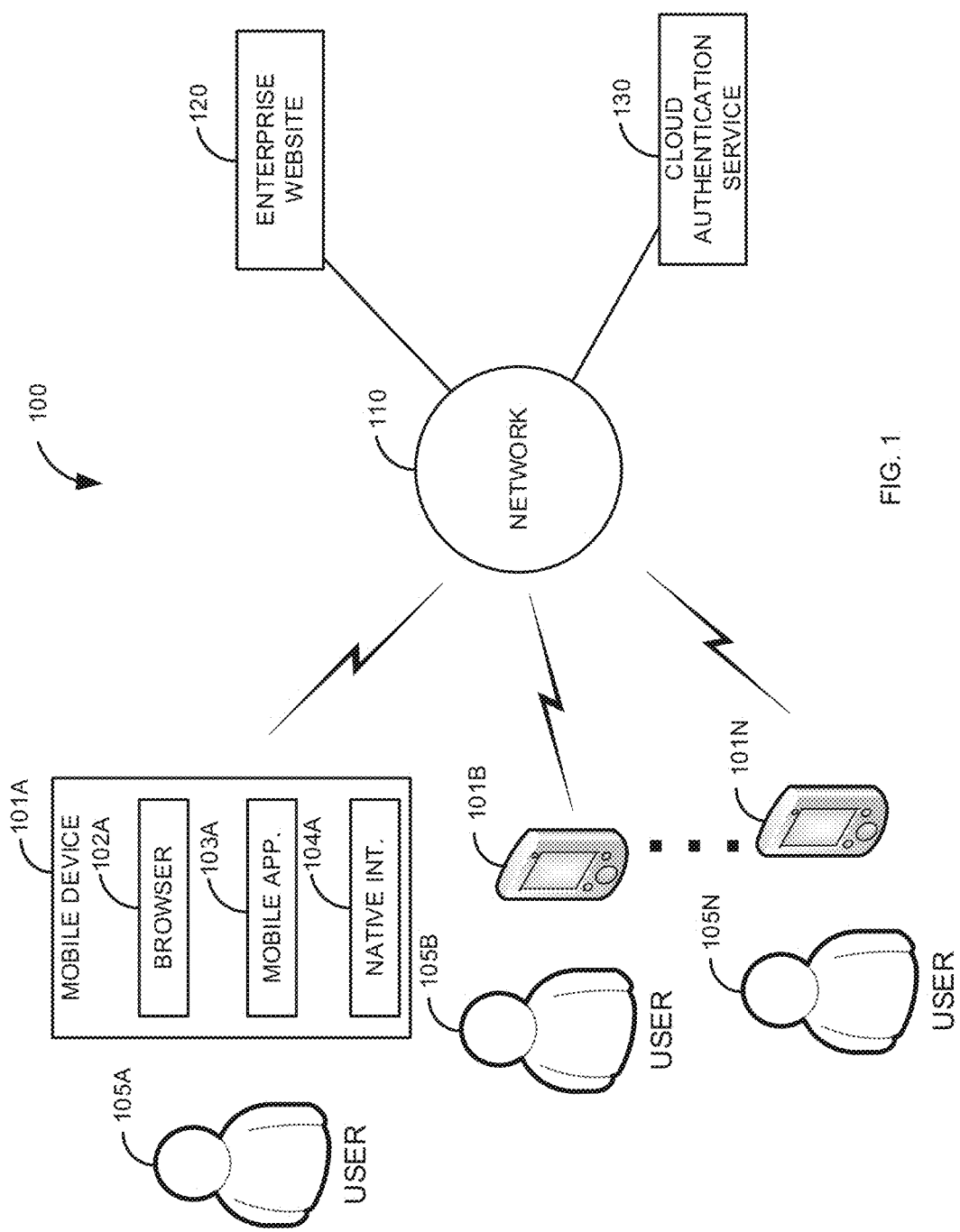
FIG. 1 is a block diagram of a first illustrative system for registering a user/mobile device of the user with an enterprise.

FIG. 1 is a block diagram of a first illustrative system 100 or registering a user 105/mobile device 101 of the user 105 with an enterprise. The first illustrative system 100 comprises mobile devices 101A-101N, a network 110, an enterprise web site 120, and a cloud authentication service 130. In addition, FIG. 1 also shows users 105A-105N who are associated with a respective mobile device 101A-101N.

The mobile device 101 can be or may include any mobile user device that can communicate on the network 110, such as, a cellular telephone, a Personal Digital Assistant (PDA), a tablet device, a notebook device, a smart phone, a tablet device, a laptop, and/or the like. As shown in FIG. 1, any number of mobile devices 101A-101N may be connected to the network 110, including only a single communication device 101.

The mobile device 101A further comprises a browser 102A, a mobile application 103A, and a native interface 104A. Although the mobile devices 101B-101N do not show a respective browser 102, mobile application 103, and native interface 104, each of the mobile devices 101B-101N may comprise each of these components.

The browser 102A can be or may include any browser that can run on the mobile communication device, such as, Google Chrome®, Firefox®, Opera®, Safari®, and/or the like. The browser 102A may be used by the user 105A to browse to the enterprise website 120.

The mobile application 103A can be or may include any application that can provide authentication services for the cloud authentication service 130. In one embodiment, the mobile application 103A may be downloaded to the mobile device 101 from the cloud authentication service 130.

The native interface 104A can be or may include any hardware coupled with software that allows the user 105A to use features on the mobile device 101, such as Short Message Service (SMS), telephone calling, video calling, email, Instant Messaging, and/or the like.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Rich Communication Services (RCS-e), Hypertext Transport Protocol (HTTP), Integrated Services Digital Network (ISDN), H.323, video protocols, and the like. Thus, the network 110 is an electronic communication network configured to carry messages via packets and/or circuit switched communications.

The enterprise website 120 can be or may include any hardware (e.g., a web server) coupled with software that provides authentication services for the user 105. The enterprise website 120 works in conjunction with the cloud authentication service 130 to authenticate a user 105/mobile device 101 of the user 105. An enterprise may be a corporation, a partnership, an organization, and/or the like.

The cloud authentication service 130 may be any network/cloud based authentication service, such as Zang®, and/or the like. The cloud authentication service 130 may provide authentication services for individual users 105, for an enterprise, and/or the like.

Figure 2:
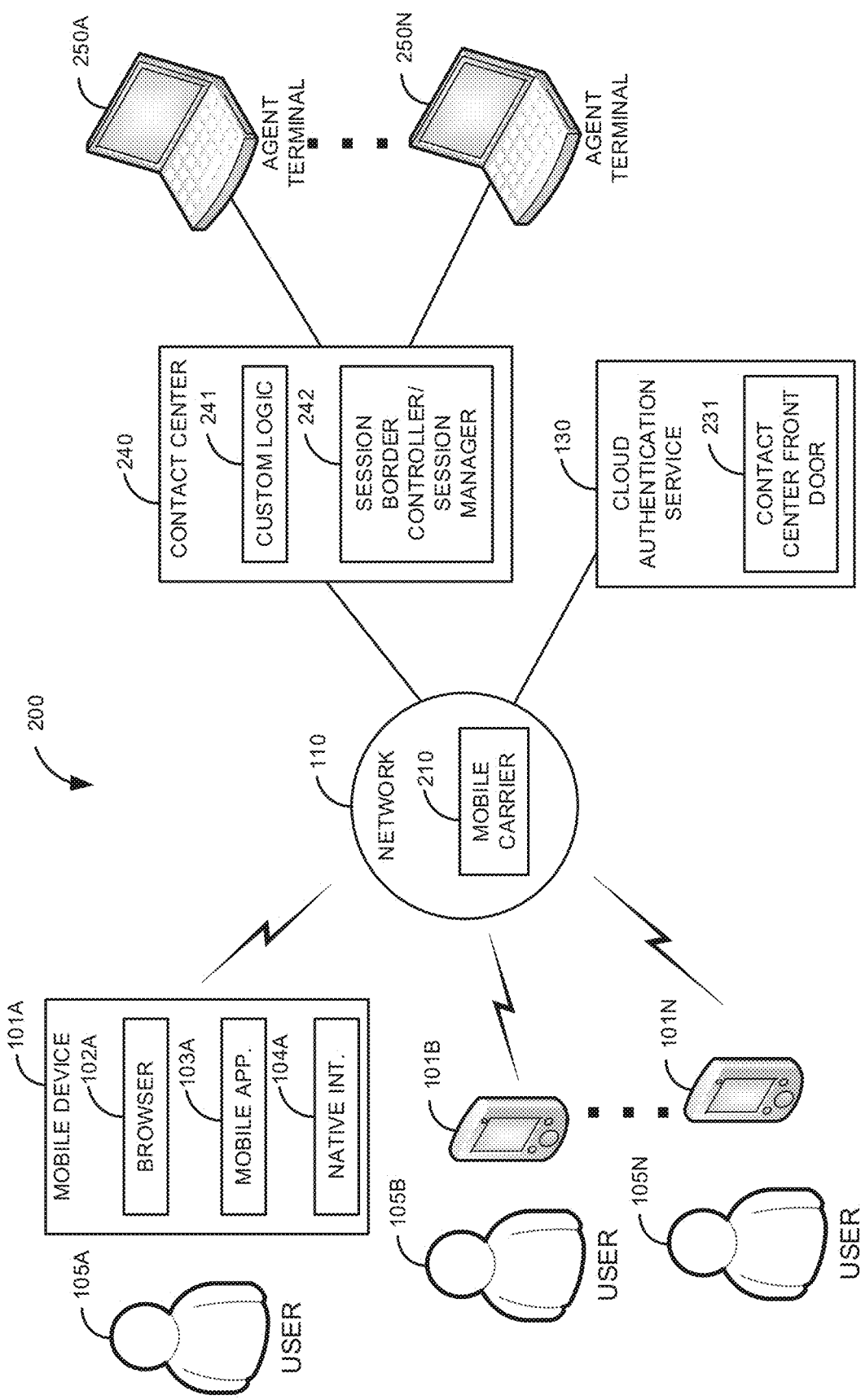
FIG. 2 is a block diagram of a second illustrative system for authenticating a user into a contact center.

FIG. 2 is a block diagram of a second illustrative system 200 for authenticating a user 105 into a contact center 240. The second illustrative system 200 comprises the mobile devices 101A-101N, the network 110, the cloud authentication service 130, the contact center 240, and agent terminals 250A-250N.

In FIG. 2, the network comprises a mobile carrier 210. The mobile carrier 210 is used to route calls from the user 105 to the contact center 240 via the mobile application 103/cloud authentication service 130.

The cloud authentication service 130 further comprises a contact center front door 231. The contact center front door 231 can be any hardware coupled with software that can provide specialized communications between the cloud authentication service 130 and the contact center 240. For example, the contact center front door 231 can provide private trunks to the contact center 240 that do not strip off information in Session Initiation Protocol (SIP) headers (e.g., an identity token described later on). The contact center front door 231 can provide other custom services to the contact center 240, such as providing a confidence level for the mobile device 101 of the user 105 and/or the user 105.

The contact center 240 can be or may include any hardware coupled with software that can provide services to the users 105A-105N. The contact center 240 can provide a variety of services to the users 105A-105N, such as, technical support, purchasing services, consulting services, product return support, and/or the like. The contact center 240 can provide services in a variety of mediums, such as voice calls, video calls, Instant Messaging, SMS, email, multimedia communications, social media networks, and/or the like.

The contact center 240 further comprises custom logic 241 and a Session Border Controller (SBC)/session manager 242. The custom logic 241 provides the ability for the contact center 240 to provide additional authentication services based on various confidence levels in the authentication process.

The SBC/session manager 242 can be or may include any hardware coupled with software that can provide communication services, such as a Private Branch Exchange (PBX), a router, a proxy server, a communication manager, and/or the like. For example, the SBC/session manager 242 may route communications between the mobile device 101 and a contact center agent at an agent terminal 250.

The agent terminals 250A-250N can be or may include any device that an agent can use to communicate with a user 105, such as a Personal computer, a telephone, a cellular telephone, a laptop, a tablet, a notebook, a smartphone, a combination of these, and/or the like.

Figure 3:
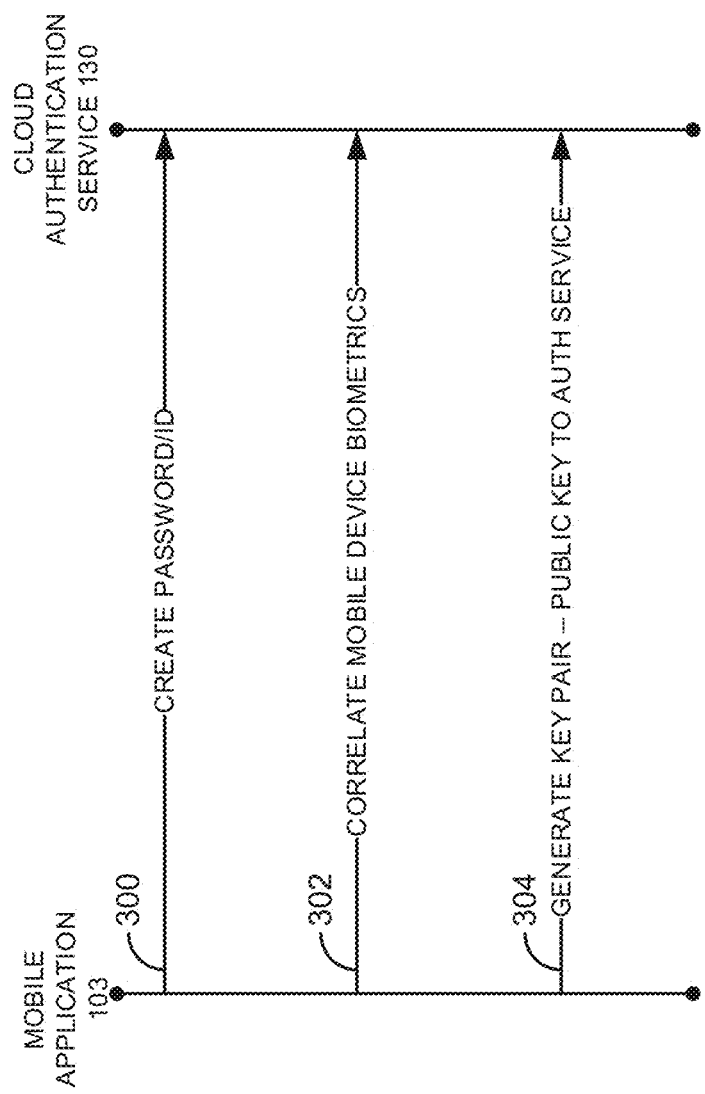
FIG. 3 is a flow diagram of a process of a user authenticating with a cloud authentication service.

FIG. 3 is a flow diagram of a process of a user 105 authenticating with a cloud authentication service 130. Illustratively, the mobile devices 101A-101N, the browser 102, the mobile application 103, the native interface 104, the enterprise website 120, the cloud authentication service 130, the contact center front door 231, the contact center 240, the custom logic 241, the SBC/session manager 242, and the agent terminals 250A-250N are stored-program-controlled entities, such as a computer or microprocessor, which performs the method of FIGS. 3-8 and the processes described herein by executing program instructions stored in a computer readable storage medium, such as a memory or disk. Although the methods described in FIGS. 3-8 are shown in a specific order, one of skill in the art would recognize that the steps in FIGS. 3-8 may be implemented in different orders and/or be implemented in a multi-threaded environment. Moreover, various steps may be omitted or added based on implementation.

The user 105, via the mobile application 103, creates a password/identifier (e.g., a user name) with the cloud authentication service 130 service in step 300. The user 105 correlates, via the mobile application 103, any mobile device biometrics with the cloud authentication service 130 in step 302. For example, the user 105 may correlate, a fingerprint, a retinal scan, a voice print, and/or the like with the cloud authentication service 130. The mobile application 103 generates a key pair (e.g., a Private/Public key) and sends the public key to the cloud authentication service 130. In this example, the user 105 can use the private key to authenticate to the cloud authentication service 130.

Figure 4:
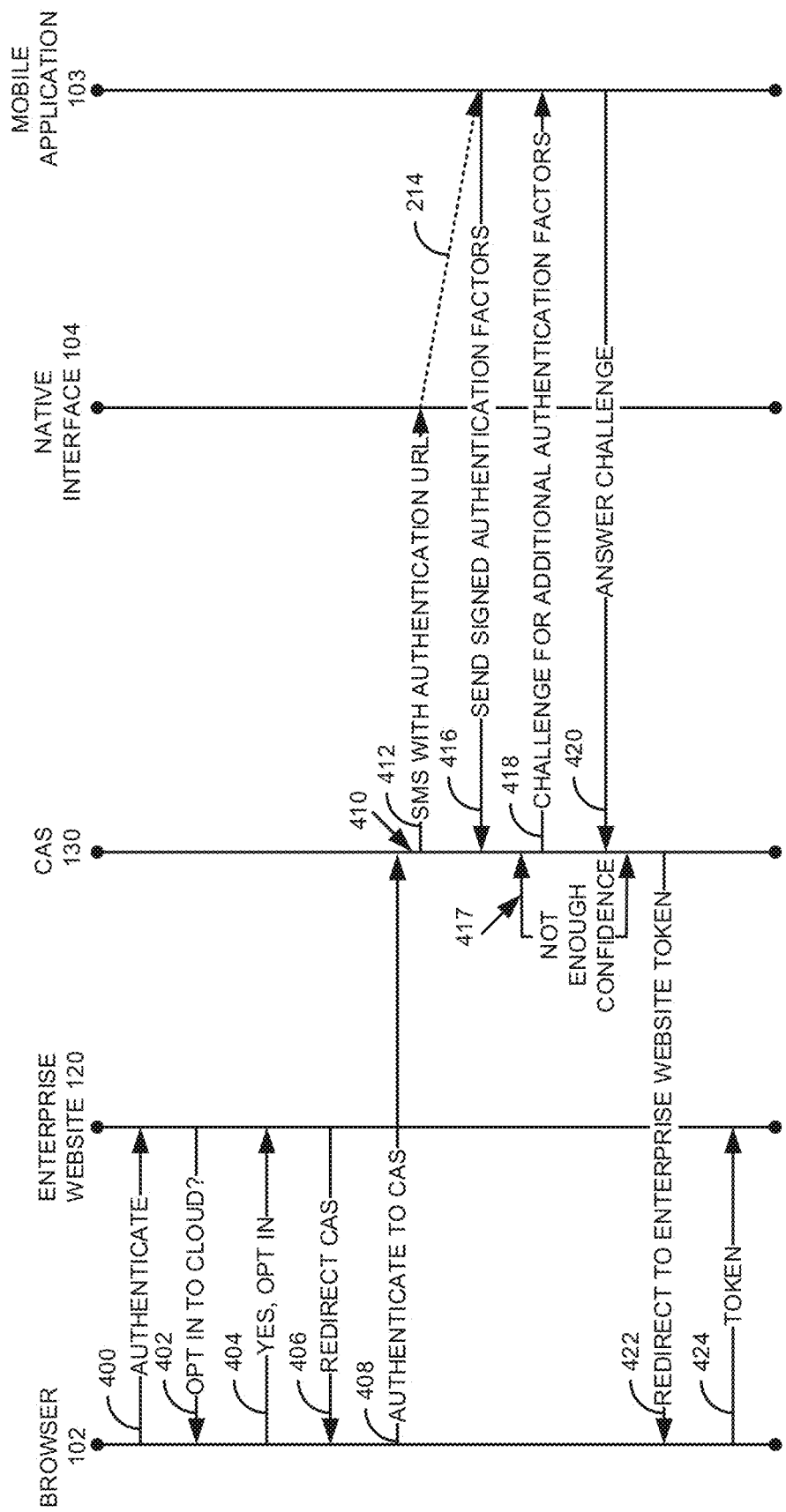
FIG. 4 is a flow diagram of a process for registering a user/mobile device of the user with an enterprise.

FIG. 4 is a flow diagram of a process for registering a user 105/mobile device 101 of the user 105 with an enterprise. After the user 105 has created an account (password/identifier) in FIG. 3, the user 105, via the browser 102 attempts to authenticate to the enterprise website 120 in step 400. The user 105 is given the option to use the cloud authentication service 130 for subsequent calls into the contact center 240 in step 402. Step 402 is not used as an alternative step to providing credentials to the enterprise website 120. If the user 105 opts into using the cloud authentication service 130, the user 105 indicates, via the browser 102, that he/she wants to opt in in step 404. In step 404, it is necessary for the user to authenticate to both the enterprise website 120 (step 400) and the cloud authentication service 130 during the enrollment process.

In response to the user 105 opting in in step 404, the enterprise website 120 redirects the browser 102 to the cloud authentication service 130 in step 406. The user 105 requests to authenticate with the cloud authentication service 130 in step 408. For example, the cloud authentication service 130 provides a website that allows the user 105 to authenticate to the cloud authentication service 130. The authentication process may use an open standard like OAuth or OpenID as part of the authentication process.

The cloud authentication service 130, in step 410, correlates the user identifier to the business user's identifier. The cloud authentication service 130 sends, in step 412, an SMS message with the Uniform Resource Locator (URL) to the native interface 104. This results in the mobile application 103 being activated in step 214. The mobile application 103 sends signed authentication factors to the cloud authentication service 130 in step 416. For example, the signed authentication factors may be sent in an encrypted communication channel.

The signed authentication factors may comprise usage characteristics of the mobile device 101. The usage characteristics may comprise information that is unique to the mobile device 101. For example, the usage characteristics may comprise one or more of the following: when the mobile device 101 was powered up, when various applications were installed, a time when telephone call(s) were made, a time when telephone call(s) were received, number(s) used in a telephone call(s), a time when text message(s) were sent, a time when text message(s) were received, a list of email addresses used for sending/receiving emails, a number of applications installed at a specific time, when a preference setting was set, a call history, an email history, an operating system version installation history, an application installation version history, a hardware upgrade history (e.g., when a memory or SIM card was installed or removed), a power-up/power-down history, a usage history, a location history of the mobile device 101, a login history, a location/time history, and/or the like. The signed authentication factors may comprise usage characteristics of the user 105 of the mobile device 101. For example, the authentication factors may comprise an angle that mobile device 101 is typically held by the user 105, a typing cadence of the user 105, applications are typically used by the user 105, and/or the like.

The authentication factors may be based on recent data usage, stale usage data (i.e., based on a defined date or time period) or a combination of recent data usage and stale usage data. The authentication factors may be based on proximity information, such as proximity to a smart watch (e.g., as discussed in FIG. 8) or a physical location (e.g., the user home).

Because the usage characteristics are unique to the mobile device 101, it would be practically impossible for another mobile device 101 to have the usage characteristics. In addition, the usage characteristics are continually being added to, which continues to create a unique signature that is specific to the mobile device 101.

In addition to the usage characteristics of the mobile device 101, the authentication factors may include known authentication factors to identify the user 105, such as a user name, password, digital certificate, voice print, retinal scan, fingerprint, security questions, and/or the like.

The signed authentication factors that are sent in step 416 may be based on a defined set of rules. For example, the signed authentication factors that are sent in step 416 may be limited to a few key usage parameters. The cloud authentication service 130 determines, in step 417, if the authentication factors provide enough confidence that the mobile communication device is the correct mobile device 101 of the user 105 and that the user 105 is the correct user 105. If the cloud authentication service 130 does not have enough confidence in the authentication factors for either the mobile device 101 or the user 105, the cloud authentication service 130 sends, in step 418, to the mobile application 103, a challenge for additional authentication factors. For example, the cloud authentication service 130 could request additional usage characteristics of the mobile device 101 of the user 105 or ask the user 105 to provide a user name and password. The mobile application 103 sends the additional authentication factors in step 420.

After receiving the answer to the challenge in step 420, the cloud authentication service 130 generates an identity token and redirects the user 105 back to the enterprise website 120 in step 422. The redirection message includes the token. The browser 102 provides the identity token to the enterprise website 120 in step 424. At this point, the user 105 is now registered with the cloud authentication service 130 for the enterprise (e.g., for calling into a contact center 240). The token is used to assert the user's cloud authentication service identity. This will often be different than the user's identity with a given enterprise. The enterprise stores an association of the identity for the user 105 with the cloud authentication service identity for the user. When the user's identity is asserted later on via tokens in FIGS. 5 and 6, the identity will be the cloud authentication service identity and the enterprise will to map to the cloud authentication service identity. The cloud authentication service token is validated by checking the signature on the token with the signing certificate used by cloud authentication service 130.

Figure 5:
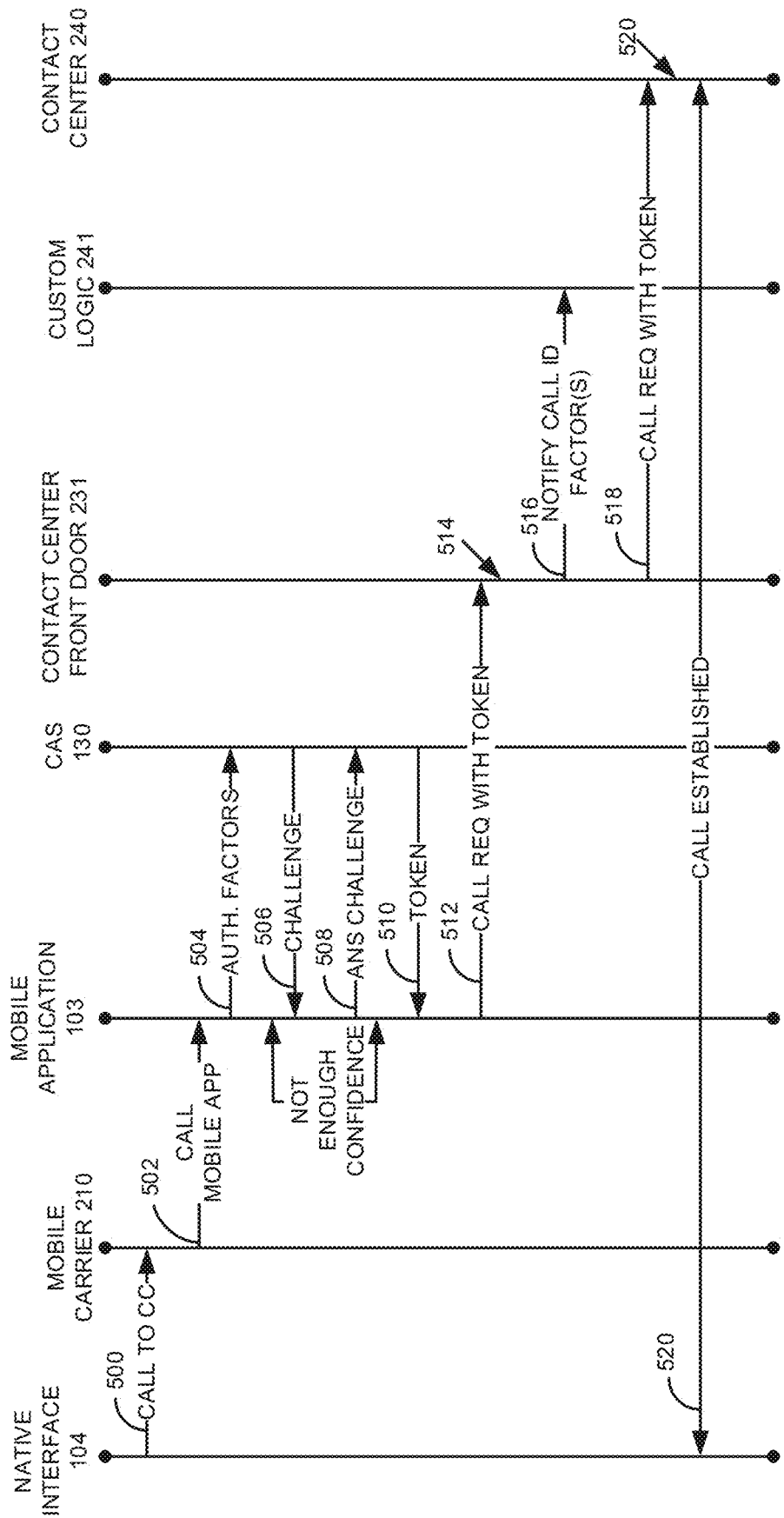
FIG. 5 is a flow diagram of a process of authenticating a user into a contact center using a Rich Communication Suite (RCS-e) enabled mobile device.

FIG. 5 is a flow diagram of a process of authenticating a user 105 into a contact center 240 using a Rich Communication Suite (RCS-e) enabled mobile device 101. The process of FIG. 5 is based on the user 105 successfully registering with the cloud authentication service 130 for the enterprise in FIG. 4.

The user 105, from the native interface 104 (e.g., using the keypad), makes a call to the contact center 240 in step 500. The call may be a voice call, a video call or an Instant Messaging (IM) call. In one embodiment, the call may comprise a SMS message to the contact center 240.

The mobile carrier 210 sends the call to the mobile application 103 in step 502. For example, the mobile carrier 210 may send the call to the mobile application 103 based on a usage agreement. Alternatively, in step 502, the mobile carrier 210 may invoke the mobile application 103 out of band. In response, the mobile application 103 sends the authentication factors to the cloud authentication service 130 in step 504. For example, the mobile application 103 may send the same authentication factors as were sent in step 416 (and possibly step 420). Alternatively, the authentication factors may include additional authentication factors (e.g., authentication factors that occurred after step 416 and 420 of FIG. 4. The cloud authentication service 130 may send, in step 506, a challenge to request additional authentication factors. For example, the cloud authentication service 130 may send the challenge if the recent usage characteristics/ locations of the mobile device 101 are not a good match to the usage characteristics/locations of the mobile device 101 in the past. The challenge may be based on the mobile device 101 being set down and the user 105 is away from the phone (e.g., as determined by a mobile watch as discussed in FIG. 8). In response, the mobile application 103 answers the challenge by sending additional authentication factors in step 508. The additional factors may include a user name/ password provided by the user 105.

If the authentication factors are acceptable, the cloud authentication service 130 sends an identity token to the mobile application 103 in step 510. The mobile application 103 sends the call request with the identity token to the contact center front door 231 in step 512. The contact center front door 231 validates the token in step 514. The contact center front door 231 can validate the identity token in different ways. For example, the contact center front door 231 can validate a signature (e.g., signed by a hashing algorithm) of the token or the contact center front door 231 can perform an introspection step (not shown) with the cloud authentication service 130 to validate the identity token.

The contact center front door 231 sends, in step 516, a notice of the incoming call with a call identification factor(s) to the custom logic 241. The call notification factors may identify a level of confidence of the mobile device 101 of the user 105, a level of confidence of the user 105, a level of confidence of an individual or group of usage characteristics, a level of confidence for a user biometric, and/or the like. The customer logic 241 can use the call notification factors in various ways. The custom logic 241 may use the call notification factors to require an additional authentication process. For example, the custom logic 241 may request that the user 105 provide a voice print (either actively or passively), ask a contact center agent to ask additional security questions, route the call to an Interactive Voice Response (IVR) system to ask additional questions of the user 105, and/or the like. If the level of confidence is high enough (e.g., above a threshold), the custom logic 241 may not request any additional authentication procedures.

The contact center front door 231 sends the call request with the token to the contact center 240 in step 518. In one embodiment, the contact center front door 231 sends the call request using a SIP INVITE message with the token. The message is sent using a private trunk that does not strip off the token (i.e., as would normally be done using the Public Switched Telephone Network (PSTN)). The contact center 240 validates the signature of the token in step 520 (e.g., based on the token received in step 424). If the token is validated in step 520, the contact center 240 know who the user 105 making the call is and establishes the call with the user 105 and a contact center agent in step 520.

The process of FIG. 5 may be implemented using various protocols. For example, process of FIG. 5 may be implemented using various protocols, such as, SIP, H.323, video protocols, Instant Messaging (IM) protocols, SMS protocols, and/or the like. If SIP were used, the call request may be a SIP INVITE message.

Figure 6:
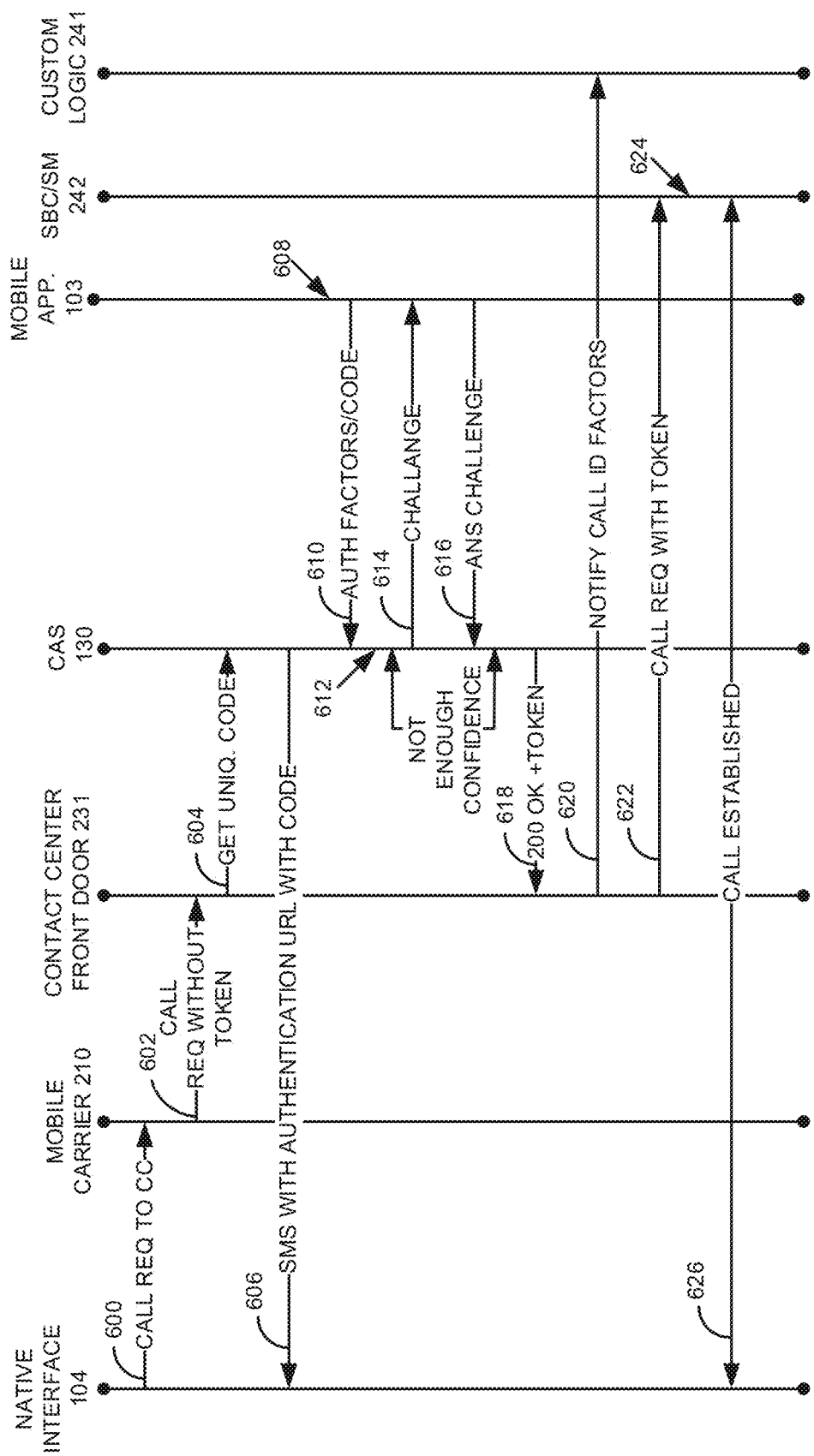
FIG. 6 is a flow diagram of a process of authenticating a user into a contact center for a non-RCS-e enable mobile device.

FIG. 6 is a flow diagram of a process of authenticating a user 105 into a contact center 240 for a non-RCS-e enable mobile device 101. The process starts when a user 105 makes a call to the contact center 240 using the native interface 104 in step 600. In FIG. 6, the call request may be for a voice call, a video call, or an SMS message. A call request (e.g., a SIP INVITE) is sent to the mobile carrier 210 in step 600. The mobile carrier 210 sends the call request without a token to the contact center front door 231 in step 602. The contact center front door 231 sends a Hypertext Transport Protocol (HTTP) GET with a unique code to the cloud authentication service 130 in step 604. The cloud authentication service 130 sends a SMS message with an authentication URL and the unique code to the native interface 104 in step 606.

As a result of receiving the SMS message with the URL/unique code in step 606, the mobile application 103 is activated in step 608. The mobile application 103 sends the authentication factors (i.e., encrypted authentication factors) and the unique code to the cloud authentication service 130 in step 610. The cloud authentication service 130 uses the unique code, in step 612, to correlate the message sent in step 606 to the message received in step 610.

The cloud authentication service 130 may challenge the mobile application 103 for additional authentication factors in step 614 if the confidence level is not high enough. For example, if the mobile device 101 has made a number of calls to telephone numbers that were previously not called by the user 105 (i.e., another user 105 has stolen the phone and is making calls to new telephone numbers), the cloud authentication service 130 may issue the challenge in step 614 for additional authentication factors (e.g., a user name and password). The mobile application 103 responds, in step 616, with the additional authentication factors.

The cloud authentication service 130 sends an HTTP 200 OK with a token in step 618, to the contact center front door 231. The contact center front door 231 sends a message to notify the custom logic 241 of the call identification factors in step 620 (similar call identification factors as discussed in step 516). The custom logic 241 may use the call identification factors to request additional authentication (e.g., passive voice recognition) if necessary.

The cloud authentication service 130 sends the call request with the token to the session border controller/session manager 242 (the contact center 240) in step 622. The session border controller/session manager 242 validates the token in step 624 (e.g., with the token received in step 424 of FIG. 4). At this points the contact center 240 has authenticated the user 105/mobile device 101 of the user 105 and a call is established with the user 105 in step 626.

The process of FIG. 6 may be implemented for SMS messages. In this exemplary embodiment, the SMS provider would have to pass the token as part of the call SMS message.

Figure 7:
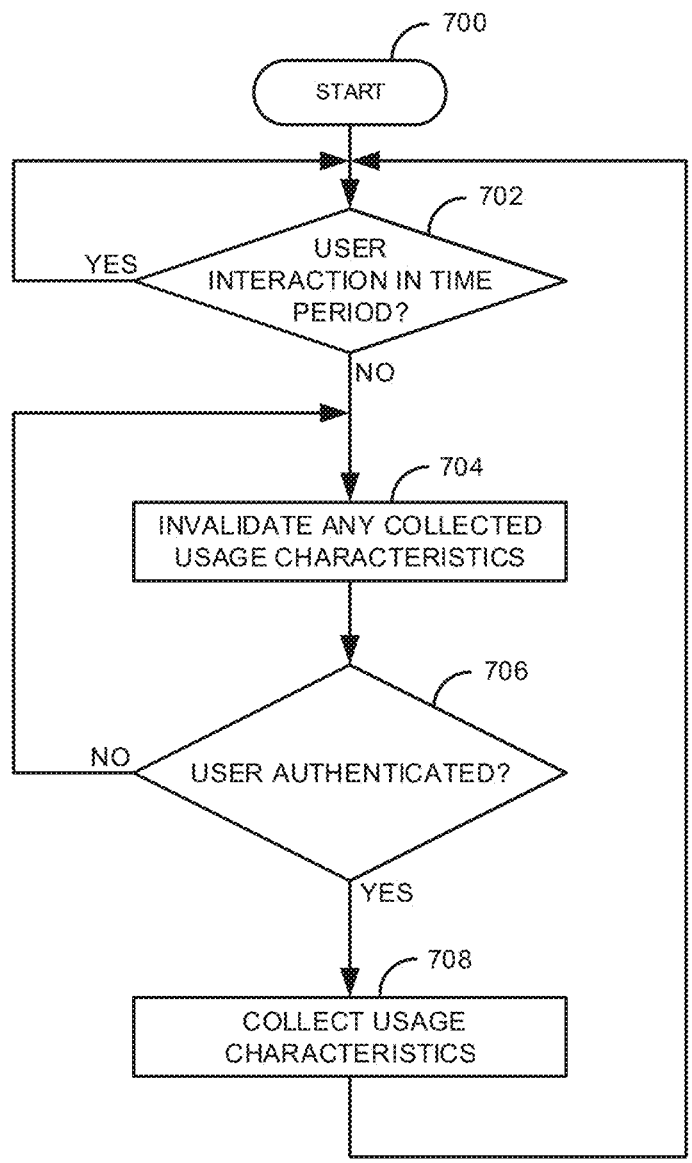
FIG. 7 is a flow diagram of a process for invalidating authentication factors of a mobile device.

FIG. 7 is a flow diagram of a process for invalidating authentication factors of a mobile device 101. The process of FIG. 7 is to identify periods where use of the mobile device 101 may be compromised. For example, where the mobile device 101 is being used by a different user 105.

The process starts in step 700. The process determines if a user interaction has occurred within a time period. For example, if the user 105 is actively using the mobile device 101. If there has been a user interaction within the time period in step 702, the process repeats step 702. Otherwise, if the user 105 has not interacted with the mobile device 101 in the time period, the mobile device 101 invalidates any usage characteristics in step 704. The usage characteristics are continued to be invalidated in step 704 as long as the user 105 has not authenticated in step 706. If the user 105 authenticates in step 706, the process goes to step 708 were the mobile device collects usage characteristics.

To illustrate, consider the following example. The user 105 interacts with the mobile device 101 in step 702. The user 105 sets down the mobile device 101 in the user's office. The time period expires in step 702. At this point, any usage characteristics are invalidated until the user 105 authenticates to the mobile device 101. If another user 105 takes the mobile device 101 and uses the mobile device 101, the usage characteristics will not be valid for that period because the other user does not authenticate.

Figure 8:
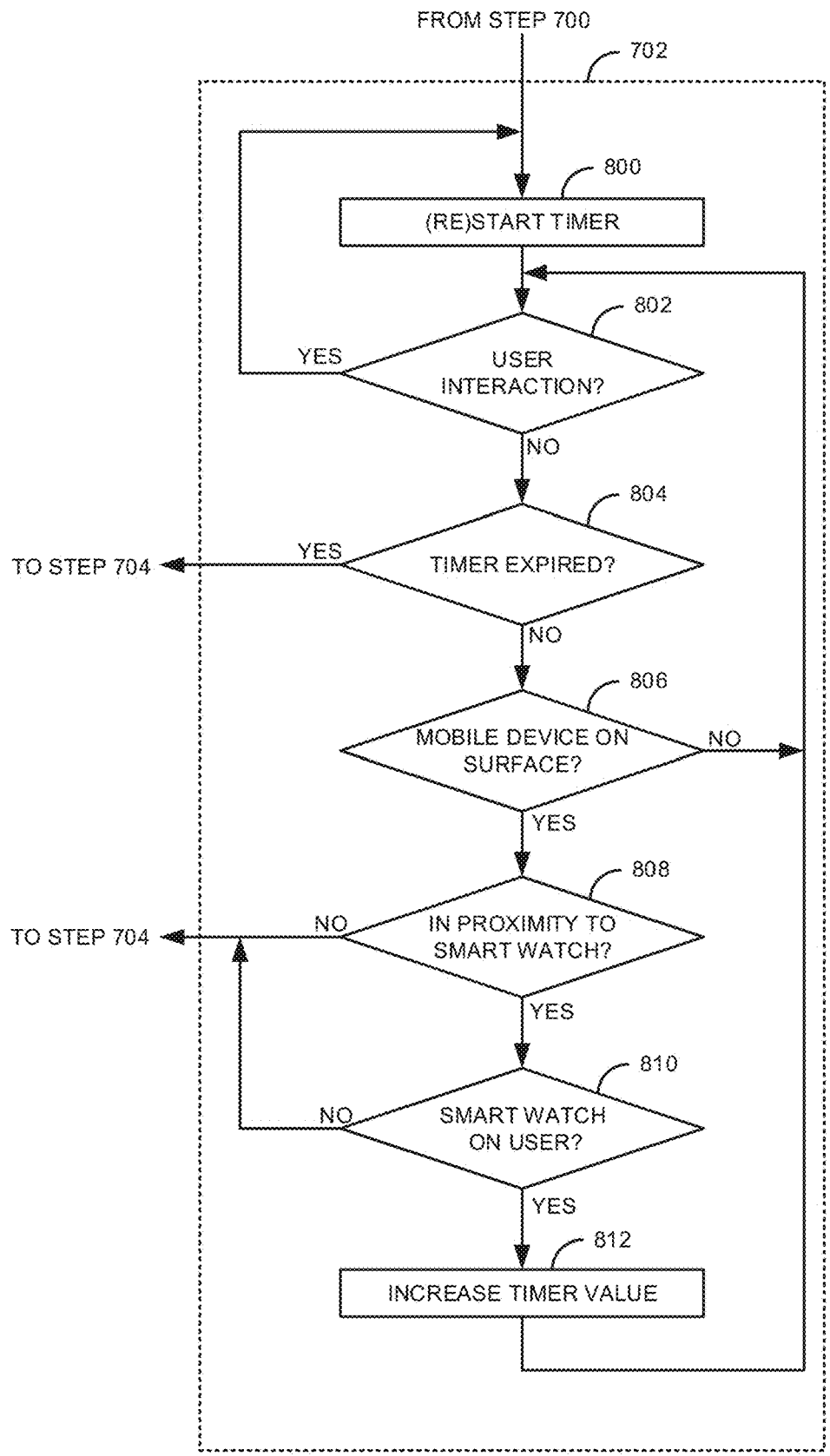
FIG. 8 is a flow diagram of a process for using a smart watch to determine whether to invalidate authentication factors of a mobile device.

FIG. 8 is a flow diagram of a process for using a smart watch to determine whether to invalidate authentication factors of a mobile device 101. The process of FIG. 8 is an exemplary embodiment of step 702 of FIG. 7. After starting in step 700, the mobile device 101 starts a timer. The value of the timer may be set based on various factors, such as the type of usage characteristics, based on a user defined value, and/or the like. The mobile device 101 determines if there has been a user interaction in step 802. If there has been a user interaction in step 802, the process goes back to step 800 where the timer is restarted.

Otherwise, if there has not been a user interaction, the mobile device 101 determines, in step 804, if the timer has expired. If the timer has expired in step 804, the process goes to step 704 where the usage characteristics are invalidated. Otherwise, if the timer has not expired in step 804, the mobile device 101 determines if the mobile device 101 is on a surface. For example, if an accelerometer determines that the mobile device 101 is not moving. If the mobile device 101 is not on a surface in step 806, the process goes back to step 802.

Otherwise, if the mobile device 101 is on a surface in step 806, the mobile device 101 determines if the mobile device 101 is in proximity to a smart watch worn by the user 105. For example, the mobile device 101 may detect the smart watch via Bluetooth communications. If the mobile device 101 is not in proximity to the smart watch in step 808, the process goes to step 704 where the usage characteristics are invalidated.

Otherwise, if the smart watch is in proximity to the user 105 in step 808, the mobile device 101 determines if the smart watch is on the user 105 (or has been taken off for a period). For example, the smart watch may send a message to the mobile device 101 indicating the smart watch has been taken off. If the smart watch is not on the user 105 in step 810, the process goes to step 704 to invalidate any usage characteristics. If the smart watch is still on the user 105 in step 810, the timer value is increased in step 812 and the process goes back to step 802. For example, if the user 105 set their mobile device 101 down while working, the timer is increased in step 812. In one embodiment, the yes branch of step 818 may go directly to step 800 to restart the timer value.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJS™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to a contact center 240. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that cause the microprocessor to:
receive, from a native interface in a mobile device of a user, a call request for establishing a call with a contact center, wherein the call request is routed by a mobile carrier for authentication;
generate a unique code, wherein the unique code is used to correlate the call request with a response from a mobile application;
receive an identity token, wherein the identity token is generated in response to an authentication process that uses authentication factors of the mobile device of the user to confirm an identity of the mobile device of the user;
validate the identity token;
in response to determining that the identity token is valid, send the call request with the identity token to the contact center, wherein the contact center uses the identity token to validate the identity of the mobile device of the user and send a notification of the incoming call with a plurality of call identification factors, wherein the plurality of call identification factors comprise a confidence level of the identity of the mobile device of the user and a confidence level of an identity of the user, and wherein sending the call request with the identity token and sending the notification of the call with the plurality of call identification factors are used to determine if the call is established or not established between the mobile device and the contact center; and
establish the call based on the confidence level of the identity of the mobile device of the user and the confidence level of the identity of the user meeting a threshold.

2. The system of claim 1,
wherein custom logic in the contact center determines if the confidence level of the identity of the mobile device of the user or the confidence level of the user is below the threshold and in response to the confidence level being below the threshold, uses an additional authentication procedure.

3. The system of claim 1, wherein at least one of the authentication factors of the mobile device is invalidated based on a smart watch of the user not being in proximity to the mobile device of the user.

4. The system of claim 1, wherein at least one of the authentication factors of the mobile device is validated based on a smart watch of the user being in proximity to the mobile device of the user.

5. The system of claim 1, wherein the microprocessor readable and executable instructions further cause the microprocessor to:
send the unique code to a cloud authentication service, wherein sending the unique code to the cloud authentication service causes the cloud authentication service to send, in a Short Message Service (SMS) message, an authentication Uniform Resource Locator (URL) and the unique code to the native interface in the mobile device of the user.

6. The system of claim 5, wherein the unique code sent to the cloud authentication service is sent in a Hypertext Transport Protocol (HTTP) GET message.

7. The system of claim 5, wherein the SMS message causes the mobile application to be activated.

8. The system of claim 7, wherein upon activation, the mobile application sends a message with the authentication factors and the unique code to the cloud authentication service.

9. The system of claim 8, wherein the cloud authentication service uses the unique code to correlate the SMS message sent by the cloud authentication service to the message with the authentication factors and the unique code.

10. The system of claim 9, wherein the cloud authentication service, based on the confidence level of the identity of the mobile device of the user and the confidence level of the identity of the usera confidence level the authentication factors, challenges the mobile application for additional authentication factors.

11. A method comprising:
receiving, from a native interface in a mobile device of a user, a call request for establishing a call with a contact center, wherein the call request is routed by a mobile carrier for authentication;
generating a unique code, wherein the unique code is used to correlate the call request with a response from a mobile application;
receiving an identity token, wherein the identity token is generated in response to an authentication process that uses authentication factors of the mobile device of the user to confirm an identity of the mobile device of the user;
validating the identity token;
in response to determining that the identity token is valid, sending the call request with the identity token to the contact center, wherein the contact center uses the identity token to validate the identity of the mobile device of the user, and sending a notification of the incoming call with a plurality of call identification factors, wherein the plurality of call identification factors comprise a confidence level of the identity of the mobile device of the user and a confidence level of an identity of the user, and wherein sending the call request with the identity token and sending the notification of the call with the plurality of call identification factors are used to determine if the call is established or not established between the mobile device and the contact center, and establishing the call based on the confidence level of the identity of the mobile device of the user and the confidence level of the identity of the user meeting a threshold.

12. The method of claim 11, wherein custom logic in the contact center determines if the confidence level of the identity of the mobile device of the user or the confidence level of the user is below the threshold and in response to the confidence level being below the threshold, uses an additional authentication procedure.

13. The method of claim 11, wherein at least one of the authentication factors of the mobile device is invalidated based on a smart watch of the user not being in proximity to the mobile device of the user.

14. The method of claim 11, wherein at least one of the authentication factors of the mobile device is validated based on a smart watch of the user being in proximity to the mobile device of the user.

15. The method of claim 11, further comprising:

sending the unique code to a cloud authentication service, wherein sending the unique code to the cloud authentication service causes the cloud authentication service to send, in a Short Message Service (SMS) message, an authentication Uniform Resource Locator (URL) and the unique code to the native interface in the mobile device of the user.

16. The method of claim 15, wherein the unique code sent to the cloud authentication service is sent in a Hypertext Transport Protocol (HTTP) GET message.

17. The method of claim 15, wherein the SMS message causes the mobile application to be activated.

18. The method of claim 17, wherein upon activation, the mobile application sends a message with the authentication factors and the unique code to the cloud authentication service.

19. The method of claim 18, wherein the cloud authentication service uses the unique code to correlate the SMS message sent by the cloud authentication service to the message with the authentication factors and the unique code.

20. The method of claim 19, wherein the cloud authentication service, based on the confidence level of the identity of the mobile device of the user and the confidence level of the identity of the user, challenges the mobile application for additional authentication factors.

* * * * *

UNITED STATES PATENT AND TRADEMARK OFFICE
CERTIFICATE OF CORRECTION

PATENT NO. : 10,742,652 B2
APPLICATION NO. : 16/149293
DATED : August 11, 2020
INVENTOR(S) : Joel Ezell, David Chavez and Michael Krack Page 1 of 1

It is certified that error appears in the above-identified patent and that said Letters Patent is hereby corrected as shown below:

In the Claims

At Column 14, Line 42, Claim 10 after "the identity of the user" please delete "a confidence level the authentication factors" therein.

Signed and Sealed this
Twenty-second Day of September, 2020

Andrei Iancu
*Director of the United States Patent and Trademark Office*